Nov. 13, 1962 H. HARDY 3,063,096
APPARATUS FOR MOLDING SHOES
Filed June 6, 1960 2 Sheets-Sheet 1

INVENTOR.
Henry Hardy
BY

ATTORNEYS

Nov. 13, 1962  H. HARDY  3,063,096
APPARATUS FOR MOLDING SHOES
Filed June 6, 1960  2 Sheets-Sheet 2
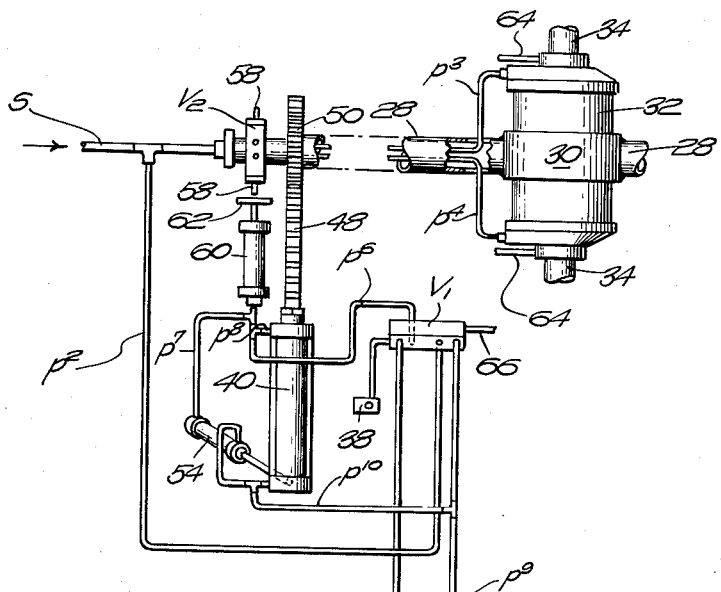
FIG. 5
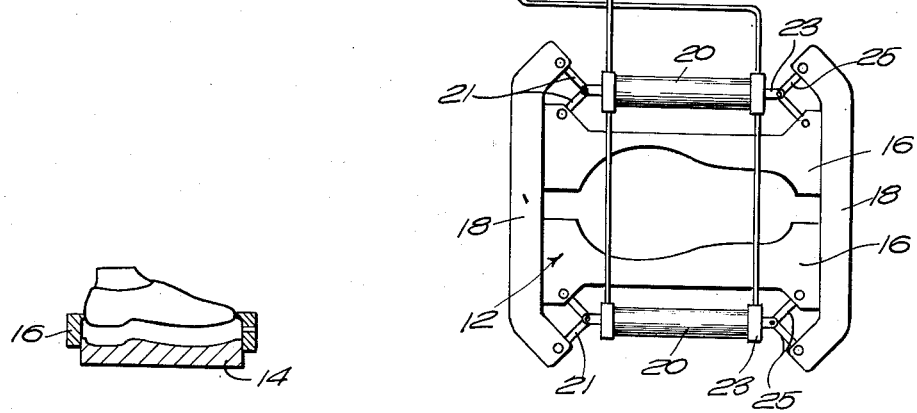
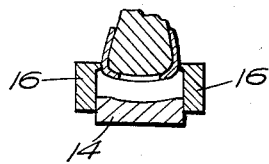
FIG. 3
FIG. 4
INVENTOR.
Henry Hardy
BY
Roberts, Cushman & Grover
ATTORNEYS

United States Patent Office 3,063,096
Patented Nov. 13, 1962

3,063,096
APPARATUS FOR MOLDING SHOES
Henry Hardy, Cambridge, Mass., assignor to International Vulcanizing Corporation, Boston, Mass., a corporation of Massachusetts
Filed June 6, 1960, Ser. No. 34,214
3 Claims. (Cl. 18—17)

This invention relates to attaching bottoms to lasted uppers and more especially to molding a plastic bottom-forming composition to the bottom of an upper.

In my Patent No. 2,878,523, there is shown an apparatus for making shoes wherein there is a pair of lasts mounted on a supported shaft for rotation relative to an open top bottom mold to bring first one and then the other last into a position above the mold and means operable to lower the shaft and hence lower a last, with an upper assembled thereon, into engagement with the open top of the mold for attachment of a bottom thereto.

The mold shown in the aforesaid patent is adapted to receive an unvulcanized sole blank for attachment to the bottom of the upper, when the latter is lowered into engagement with the top of the mold, by supplying vulcanizing heat to the last. The same apparatus, however, may be employed for injection molding by the simple expedient of providing an injection opening in a wall of the mold and, after the last is lowered into engagement with the mold, injecting a hot plastic bottom-forming composition into the mold cavity to fill it.

Movement of the last into and out of operative position is effected manually in the aforesaid apparatus. It is the principal object of this invention to provide for automatic control of apparatus of the aforesaid kind, so that the operator is relieved of the necessity of moving the last into and out of operative position and hence may devote greater care to properly assemblying the upper on the last preparatory to the bottom molding and to stripping the finished shoe from the last after molding without interfering with the productive capacity of the machine.

As herein illustrated, there is a mold for receiving a bottom-forming composition, a fluid operable cylinder containing a piston rod, the ends of which protrude from the opposite ends of the cylinder to which are fastened lasts, and means supporting the cylinder intermediate its ends above the mold for rotation about a horizontal axis relative to the mold for movement of first one last and then the other into a position above the mold, the cylinder being operable by supplying pressure to its ends to lower each last in turn into engagement with the mold for injection and thereafter to lift the finished shoe away from the mold. The mold has a bottom and side parts, the latter being movable into engagement to provide a mold cavity and apart to permit removal of the finished shoe, and there is a pair of fluid operable cylinders connected to the mold halves for effecting movement thereof into and out of engagement. A first valve supplies fluid pressure to the pair of fluid operable cylinders and a second valve supplies fluid pressure to the cylinder, and there is means for initiating operation of the apparatus by shifting the first valve so as to supply air to the pair of cylinders in a direction to separate the mold halves, an actuator operable by air supplied thereto from the first valve to shift the second valve so as to supply air to the lower end of the cylinder and hence to raise the last at the lower side of the support from the mold, a trip movable with the last as it is raised to shift the first valve so as to supply air to the pair of cylinders in a direction to close the mold parts, and means operable by pressure supplied thereto during the upward movement of the last to rotate the cylinder, end for end, to move the lower last at the lower side of the support with the finished shoe thereon to a position above the support and simultaneously to move the last at the upper side of the support, with an upper assembled thereon, to the lower side for engagement with the mold.

The invention will now be described in greater detail with reference to the accompanying drawings wherein:

FIGS. 3 and 4 are longitudinal and transverse sections through a mold with an injection opening, showing a last seated against the top; and FIG. 5 is a schematic of the control for effecting operation of the machine.

Figure 1:
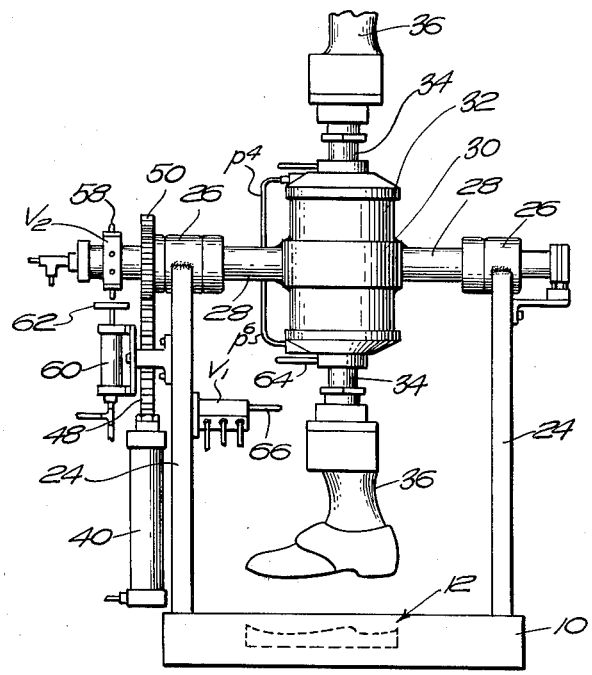
FIG. 1 is an elevation of the upper part of the machine.
Figure 2:
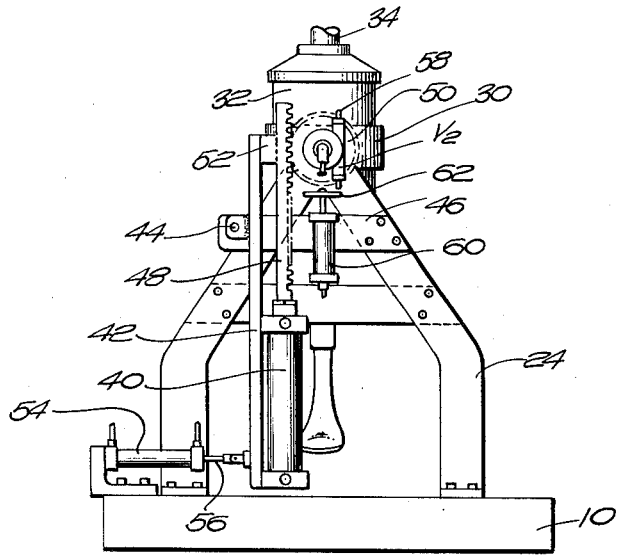
FIG. 2 is a side elevation as seen from the left side of FIG. 1.

Referring to the drawings, FIGS. 1, 2 and 3, the apparatus has a hollow supporting base 10 which provides a housing for a mold 12 having a bottom part 14, and side parts 16, the latter being movable into engagement to provide a mold cavity for receiving a moldable material and movable apart to permit removing a finished shoe by operating mechanism, shown to larger scale in the schematic in FIG. 5. The mold side parts 16—16 are supported betwen rigid bars 18—18 fixed to the base. Movement of the mold side parts is effected by pneumatic cylinders 20—20, the left-hand ends of which are pivotally connected by links 21—21 to the mold parts and the bar 18 at that end, and the right-hand ends of which have piston rods 23 extending therefrom, the protruding ends of which are pivotally connected by links 25 through the mold parts and the bar 18 at that end.

A pair of laterally spaced, generally A-shaped end frames 24—24 (FIGS. 1 and 2) are fastened at their lower ends to the base 10 and at their apices support bearing members 26—26 in which there is rotatably journaled a pair of trunnions 28—28 which are welded or otherwise secured at their inner ends to a ring 30. A relatively large diameter cylinder 32 is fastened in the ring 30 and has protruding from its opposite ends rods 34—34 to which are fastened lasts 36—36. By rotating the trunnions 28—28 the cylinder 32 may be rotated to bring one of the lasts into a position directly above the mold 14, beneath the trunnions, and the other to a position above the trunnions which is convenient for assembling an upper thereon. The cylinder 32 contains a piston to which the rods 34—34 are fixed and by supplying pressure fluid to the upper end of the piston the last at the lower end may be lowered into engagement with the open top of the mold. Following injection of the bottom-forming composition and cooling, fluid pressure is supplied to the lower end of the cylinder to raise the last from the mold and then the cylinder is rotated on the axis of the trunnions to raise the finished shoe to the loading position above the axis of the trunnions where it may be stripped off of the last and simultaneously to lower the other last, with an upper assembled thereon, into a position for lowering into engagement with the mold.

A four-way valve VI (FIG. 5), is mounted on the left one of the frame members and is adapted to supply air to the rear ends of the cylinders 20—20, through a pipe p1. The valve is connected to a source S of air pressure by a pipe p 2. The valve VI also supplies air to the lower ends of a cylinder 40 and to the forward end of the cylinder 54. The cylinder 40 is supported at its lower end on a bracket 42, which is pivoted at 44 on a cross-bar 46, fastened to the left-hand one of the A-frames. A rack bar 48 protrudes from the upper end of the cylinder 40 and is engaged with a gear 50 fastened to an extension of the left-hand one of the trunnions. A guide 52 on the bracket 42 slidably supports the rack bar near its upper end. The bracket 42 is held in a vertical position with the rack bar engaged with the gear by the cylinder 54 which is fastened to the base and which has a rod 56 protruding from its forward end, the forward extremity of which is fastened to the bracket.

A valve V2 is also mounted upon an extension of the left-hand one of the trunnions, laterally of the gear 50, and has protruding from its opposite ends spindles 58—58 for shifting a valve spool therein from one position to another and, by such shifting movement, to permit air from the aforesaid source S to pass through it to either the upper end of the cylinder 32 or the lower end through pipes p3 and p4 respectively. At this particular time, the valve V2 is so shifted that the air is supplied to the upper end of the cylinder since the last is being held engaged with the mold.

Assuming that an upper has been placed on the last at the upper end of the cylinder, the cycle is initiated by depressing the starting button 38 (FIG. 5). This bleeds air from the four-way valve V1 so that the spool therein shifts to allow air to flow through a pipe p9 to the forward end of the cylinders 20—20 to separate the mold halves, thereby to release the bottom of the shoe which has just been completed, or if this is the first operation merely to separate the mold halves. Air is also supplied through a pipe p6 to the lower end of the cylinder 60, so as to raise a valve actuator 62. The valve actuator 62 shifts the spool in the valve V2 by engagement with one of the spindles 58—58, so as to reverse the direction of flow of air to the cylinder 32, that is, to supply it to its lower end for raising the last away from the mold. Flow through the valve V2, however, is restricted so as to delay the upward movement of the piston in the cylinder 32. Simultaneously, air is supplied through a pipe p7 to the rear end of a cylinder 54 to rock the rack bar rearwardly out of engagement with the gear 50 and to the upper end of the cylinder 40 through a pipe p8 to lower the rack bar 48. This takes place during the delayed action and as the piston rises slowly in the cylinder 32 a pin 64 on the rod 34 strikes a rod 66 protruding from the valve V1, so as to shift the spool therein to close the mold halves by supplying air through a pipe p1 to the rear end of the cylinders 20—20. Simultaneously, air is supplied to the forward end of the cylinder 54 and the lower end of the piston 40 through a pipe p10 to rock the rack bar back into engagement with the gear and raise it so as to rotate the trunnions 28—28, thereby to move the last with the finished shoe thereon to the upper side and to move the last with the upper assembly thereon to the lower side into a position above the open top of the closed mold. The cylinder 32 is rotated half a turn before the piston moves through its entire stroke hence the last moving downwardly reaches the position directly above the mold soon enough so that the final movement of the piston presses the lasted upper against the closed mold therebelow. Rotation of the trunnions carries the valve V2 with it so that its opposite end is now situated above the actuator 62 and the cycle may be repeated by again depressing the starting button 38.

While the apparatus is described with reference to injection molding, as pointed out heretofore, it is equally useful in applying unvulcanized sole blanks in the fashion disclosed in my Patent No. 2,828,523. The operator would, of course, have to drop a sole blank into the mold cavity just before the lasted upper was lowered into engagement with the mold.

To derive the maximum benefit from the mold apparatus described above, it is contemplated that a plurality of such assemblies may be mounted on a rotary table, endless belt or the like, for movement relative to injection apparatus of the kind shown in the Foster Yates patent, No. 2,885,734. A plurality of mold assemblies would be mounted on the table or conveyor for movement of each one up to the injector where it would be stopped and brought into engagement with the nozzle of the injector for an injection of the bottom-forming composition. After injection the assembly would be moved beyond the injector through a path sufficiently long to permit cooling so that when it arrives back at the injector, the finished shoe can be stripped and another upper moved into bottom-attaching position in readiness for injection.

It should be understood that the present disclosure is for the purpose of illustration only and that this invention includes all modifications and equivalents falling within the scope of the appended claims.

I claim:
1. Apparatus for attaching bottoms to lasted uppers, comprising a mold having halves movable together to provide a mold cavity comprising a first fluid motor containing a piston rod, the ends of which protrude from the opposite ends of the motor, a rotatable support mounting the first fluid motor above the mold for rotation about a horizontal axis, a last fixed to each of the protruding ends of the piston rod, said lasts being rotatable with the motor about the support to move first one last and then the other from a posiiton above the axis of the support to a position below the axis of the support directly above the mold, said first fluid motor being operable alternately to hold a last engaged with the mold and to lift it therefrom, a second fluid motor, means operably connecting the second fluid motor to the mold halves to effect relative movement of the mold halves, a pinion gear on the support, a rack movable into and out of engagement with the pinion gear, said rack being reciprocable to rotate the pinion half a turn in one direction and then half a turn in the other direction, a third motor, means operably connecting the third motor to the rack to move the rack lengthwise, a fourth motor, means operably connecting the fourth motor to the rack to move the rack into and out of engagement with the pinion, a source of pressure, conductors connecting the source to the motors, first and second valves, a valve actuator for the second valve, means for shifting the first valve to supply pressure fluid to the second fluid motor in a direction to separate the mold halves, to the first fluid motor in a direction to raise the last at the lower side of the support from the mold, and to the valve actuator to shift the second valve in a direction to supply fluid to the third and fourth motors in directions to move the rack out of engagement with the pinion gear and to lower the rack, and means operable by the last as it moves upwardly to shift the first valve back to its initial position to supply fluid pressure to the third and fourth motors in directions to rock the rack back into engagement with the pinion gear and to raise the rack so as to rotate the support half a turn prior to termination of the operation of the first fluid motor.

2. Apparatus for attaching bottoms to lasted uppers comprising an open top mold providing a mold cavity for supporting a bottom blank, a first fluid motor containing a piston rod, the ends of which protrude from the opposite ends of the motor, a rotatable support mounting the first fluid motor above the mold for rotation about a horizontal axis parallel to the top of the mold, a last fixed to each of the protruding ends of the piston rod, said rod being rotatable with the motor about the support to move first one last and then the other from a position above the axis of the support to a position below the axis of the support directly above the mold, said first motor being operable alternately to hold a last engaged with the mold and to lift it therefrom, a pinion gear on the support, a rack movable into and out of engagement with the pinion gear, a second motor, means operably connecting the second motor to the rack to move the rack linearly, a third motor, means operably connecting the third motor to the rack to move the latter into and out of engagement with the pinion, first and second valves, a valve actuator for the second valve, means for shifting the first valve to supply pressure fluid to the first fluid motor in a direction to raise the last at the lower side of the support from the mold and to the valve actuator to shift the second valve in a direction to supply fluid to the second and third motors in directions to move the rack out of engagement with the pinion gear and to lower the rack, and means operable, by the last as it moves upwardly, to shift the first valve back to its initial position to supply fluid pressure to the second and third motors in directions to rock the rack back into engagement with the pinion gear and to raise the rack so as to rotate the support half-a-turn prior to termination of the operation of the first fluid motor.

3. Apparatus for attaching bottoms to lasted uppers comprising an open top mold providing a mold cavity for supporting a bottom blank, a support rotatable about a horizontal axis parallel to the top of the mold, a rod mounted on the support with its ends extending in opposite directions from the axis of rotation of the support for movement of the rod in reciprocation, a reversible motor for effecting reciprocation of the rod, a last fixed to each end of the rod, said rod being rotatable with the motor about the axis of the support to move first one last and then the other from a position above the axis of the support to a position below the axis of the support directly above the mold, said first motor being operable alternately to hold the last engaged with the mold and to lift it therefrom, a first drive element on the support, a second drive element movable into and out of engagement with the first drive element operable, by linear movement while engaged with the first drive element, to effect rotation of the support, a second motor, means operably connecting the second motor to the second drive element to move it linearly, a third motor, means operably connecting the third motor to the second drive element to move it into and out of engagement with the first drive element, first and second means for supplying power to the motors, an actuator for the second means, third means for shifting the first means to supply power to the first motor in a direction to raise the last at the lower side of the support from the mold and to said actuator to shift the second means in a direction to supply power to the second and third motors in directions to move the second drive element out of engagement with the first drive element and to lower the second drive element, and means operable, by the last as it moves upwardly, to shift the first means back to its initial position to supply power to the second and third motors in directions to rock the second drive element back into engagement with the first drive element and to raise the second drive element so as to rotate the support half-a-turn prior to termination of operation of the first motor.

References Cited in the file of this patent

UNITED STATES PATENTS

| 989,211 | Updegroff | Apr. 11, 1911 |
| 2,381,125 | Herman | Aug. 7, 1945 |
| 2,489,069 | Adams et al. | Nov. 22, 1949 |
| 2,798,254 | Canat | July 3, 1957 |
| 2,801,442 | Maslo | Aug. 6, 1957 |
| 2,878,523 | Hardy | Mar. 24, 1959 |

FOREIGN PATENTS

| 161,853 | Australia | Mar. 10, 1955 |